No. 621,157. Patented Mar. 14, 1899.
J. M. SEAY.
FERTILIZER DISTRIBUTER.
(Application filed July 3, 1897.)

(No Model.) 2 Sheets—Sheet 1.

No. 621,157. Patented Mar. 14, 1899.
J. M. SEAY.
FERTILIZER DISTRIBUTER.
(Application filed July 3, 1897.)
(No Model.) 2 Sheets—Sheet 2.
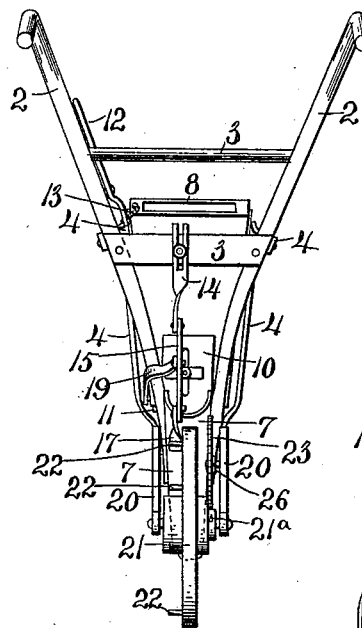
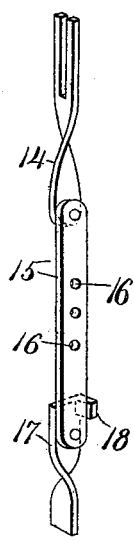
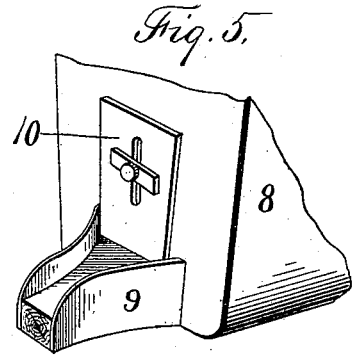
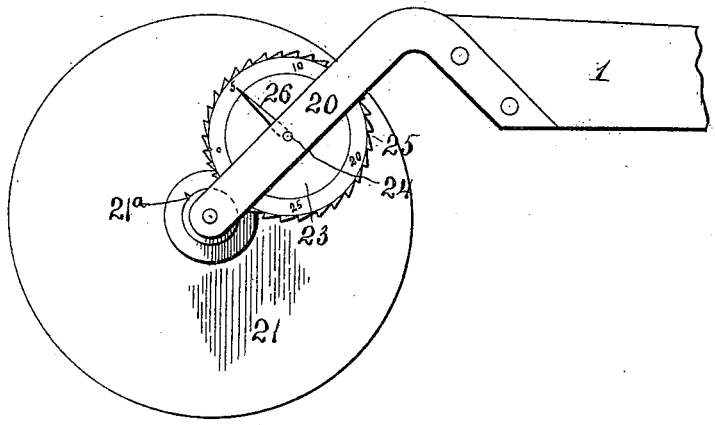
Inventor
Julius Mimms Seay.
by John Wedderburn
Attorney
Witnesses
W. E. Allen
Victor J. Evans

UNITED STATES PATENT OFFICE.

JULIUS MIMMS SEAY, OF WOODBURY, GEORGIA, ASSIGNOR OF ONE-HALF TO GEORGE WOOSTER, OF SAME PLACE.

FERTILIZER-DISTRIBUTER.

SPECIFICATION forming part of Letters Patent No. 621,157, dated March 14, 1899.

Application filed July 3, 1897. Serial No. 643,363. (No model.)

*To all whom it may concern:*

Be it known that I, JULIUS MIMMS SEAY, of Woodbury, in the county of Meriwether and State of Georgia, have invented certain new and useful Improvements in Fertilizer-Distributers; and I do hereby declare the following to be a full, clear, and exact description of the invention, such as will enable others skilled in the art to which it appertains to make and use the same.

My invention relates to fertilizer-distributers; and its object is to provide an improved form of fertilizer-distributer which will operate to distribute the fertilizer in small quantities throughout the ground over which the same may pass, said quantities being dropped at intervals thereover.

My invention consists of certain novel features of construction and combinations of parts, as hereinafter fully described and claimed.

Figure 1:
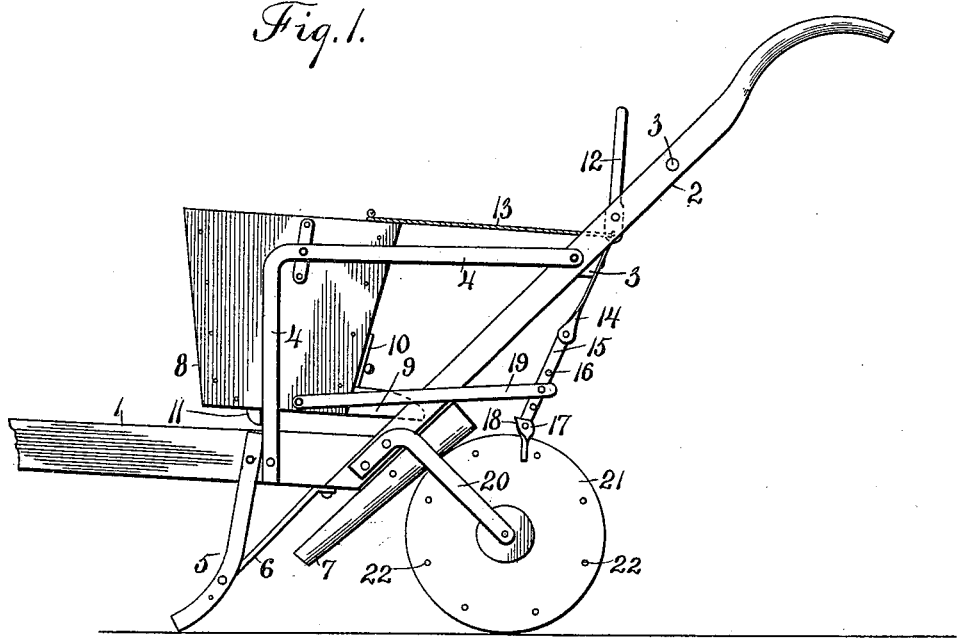
Figure 2:
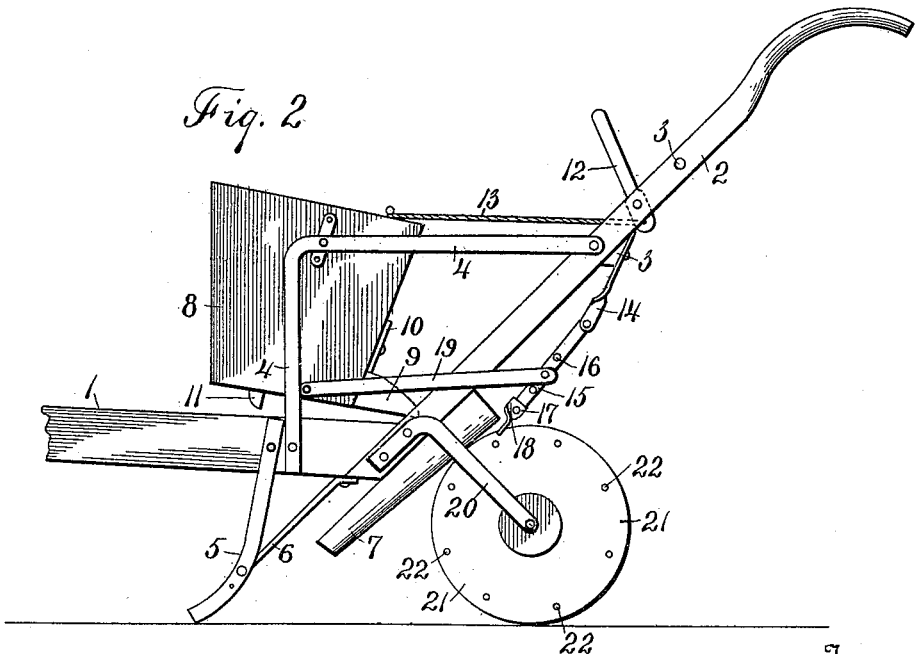

In the accompanying drawings, Figure 1 is a side elevation of my device when in operative position. Fig. 2 is a similar view showing the distributer thrown out of gear. Fig. 3 is a rear view of my machine. Fig. 4 is an enlarged detail of the lower end of my operating-lever, showing the latch in position; Fig. 5, a detail of the trough, and Fig. 6 a detail of the measuring mechanism.

The numeral 1 indicates a plow-beam of ordinary form. Handles 2, having cross-bars 3, are firmly attached thereto. Angular supports 4 extend outward from said handles and down to said beam, being bent inward to attach thereto, and are secured firmly to said handles and said beam. A plow-standard 5 is secured to said beam and is adapted to receive a plow-point or cultivator-point, as desired. A brace 6 serves to hold said standard firmly in position. A spout 7 is secured to said beam, extending downward therefrom to a point immediately behind said plow-standard. A hopper 8, provided with a discharge-spout 9 and an adjustable gate 10, is pivotally mounted between the supports 4. Stops 11 serve to limit the motion of said hopper in one direction. A lever 12 is secured to one of the handles about on a level with the upper end of the hopper. A flexible connection 13 extends from the lower end of this lever to the hopper and is adapted to pull the upper end of said hopper toward said handles when the lever is turned. A hanger 14 is adjustably attached to one of the cross-braces between said handles. A lever 15 is pivotally mounted upon said hanger and is provided with a series of openings 16. A trip-latch 17 is pivotally mounted at the lower end of said lever. The latch 17 is provided with a stop 18 to limit the motion thereof in one direction. A pitman 19 serves to connect the lower end of said hopper with one of the openings in said lever. Bracket-arms 20 extend outward and downward from said handles, being firmly held thereon. A wheel 21, provided with a series of pins 22, projecting therefrom, is mounted between the said arms 20 on a shaft journaled therein.

It will now be plain from the drawings that when said device is drawn forward the wheel will turn, the pins striking against the trip-latch on the lower end of the lever, and the hopper will thus be given a successive series of jerks, which will serve to empty a small portion of the fertilizer into the spout at each one thereof. It is obvious that the distance apart of these quantities of fertilizer may be regulated by the distance apart of the pins upon the wheel. I therefore preferably employ wheels arranged with varying numbers of pins adapted to be inserted in place of each other. Further, it is obvious that the harder the jerk given to the hopper the more fertilizer will be dropped therefrom. I therefore provide the openings in the lever before mentioned in order to regulate these by adjusting the pitman nearer to or farther from the fulcrum of the lever.

By rocking the hopper by means of the lever 12 and cord 13, connected with its upper end, the lower end of the hopper can be swung forward thereby through link 19, drawing the latch 18 on the hopper 17 forward out of reach and action thereon by the pins 22, as shown in Fig. 2.

In order to determine the amount of fertilizer distributed within a given space and to regulate the mechanism accordingly to distribute a certain amount, I have provided a graduated disk 23, revolubly mounted in the bracket-arms 20 on a shaft 24, said disk being provided with peripheral teeth 25. These teeth may be in number as desired and are preferably arranged in series of five, (indicated by the lines of graduation on said disk.) A pointer 26, rigidly connected to said shaft, is adapted to indicate the number of teeth opposite it. The wheel 21 is provided with a spur 21ª, adapted to engage said teeth and rotate the disk, thus moving the disk the distance of one tooth at each revolution of the wheel, so that the amount of fertilizer distributed can be readily and quickly ascertained when the diameter of the wheel is known.

Having thus described my device, what I claim as new, and desire to secure by Letters Patent, is—

1. In a fertilizer-distributer, the combination with a beam, the handles therefor, and the wheel on which said beam is mounted, of the angular side supports secured to said beam and handles, the hopper pivotally suspended between said supports on horizontal pivots near its upper end, and provided with a rigid bottom having a rearwardly-projecting discharge-spout, and means connecting the wheel with the bottom of said hopper, for giving a forward and backward vibration thereto, substantially as described.

2. In a fertilizer-distributer, the combination with a beam and the handles therefor, of angular side supports connected to said beam and handles, a hopper pivotally suspended between said supports, a lever suspended from the handles, a pitman connecting said lever to the hopper, a wheel carrying said beam and handles provided with a series of teeth adapted to act upon the lower end of said lever for vibrating the hopper, and a stop for limiting the movement of the hopper in one direction, substantially as described.

3. In a fertilizer-distributer, the combination with a plow-beam, of handles secured thereto, angular supports secured to said beam and handles, a hopper pivotally mounted between said supports and provided with an opening in its lower part, means for closing said opening, a spout integral with the hopper leading from said opening, and means for vibrating said hopper on its pivot, substantially as described.

4. In a fertilizer-distributer, the combination with a plow-beam and handles thereof, of angular supports, a hopper pivotally supported between said supports, a pendent bracket adjustable upon said handles, a lever fulcrumed upon said bracket provided with a series of spaced openings, a pitman connected with said hopper and adjustably connected with said lever, a trip-latch pivotally mounted upon said lever, a stop formed upon said latch adapted to limit its motion in one direction, and a wheel on which said beam is carried provided with a series of teeth adapted to act upon said latch and vibrate said lever, substantially as described.

5. In a fertilizer-distributer, the combination with a plow-beam, of supports carried thereon, a hopper provided with an opening in the lower part thereof and pivotally mounted upon said supports, stops to limit the motion of said hopper in one direction and act upon said hopper to close said opening, a spout held upon said frame, a second spout upon said hopper leading to the first-mentioned spout, a lever fulcrumed upon said frame, a flexible connection between the top of said hopper and said lever, an adjustable hanger extending downward from said frame, a lever provided with a series of spaced openings fulcrumed upon said hanger, a pitman connected to said hanger and adjustably connected with said lever through the openings therein, a latch pivotally mounted upon said lever provided with a stop to limit its motion in one direction, supports extending outward from said frame, and a toothed wheel journaled in said supports adapted to act upon the latch for operating the lever, substantially as described.

6. In a fertilizer-distributer, the combination with a beam and the handles therefor, of the angular supports connected to said pitman and handles, a hopper pivotally mounted on said supports, a carrying-wheel for said parts provided with adjustable pins or teeth, a lever having a pivoted latch engaging said teeth, a pendent support for said lever, a link connection between said lever and pivoted hopper, and a lever connected to the upper end of the pivoted hopper for regulating it to throw its actuating-lever out of engagement with the toothed wheel, substantially as described.

In testimony whereof I have signed this specification in the presence of two subscribing witnesses.

JULIUS MIMMS SEAY.

Witnesses:
J. T. BOWEN,
F. P. MORRIS.